A. BARTELS.
APPARATUS FOR THE MANUFACTURE OF HORN LIKE MASSES FROM CASEIN.
APPLICATION FILED FEB. 16, 1916. RENEWED APR. 22, 1920.
1,375,623.
Patented Apr. 19, 1921.
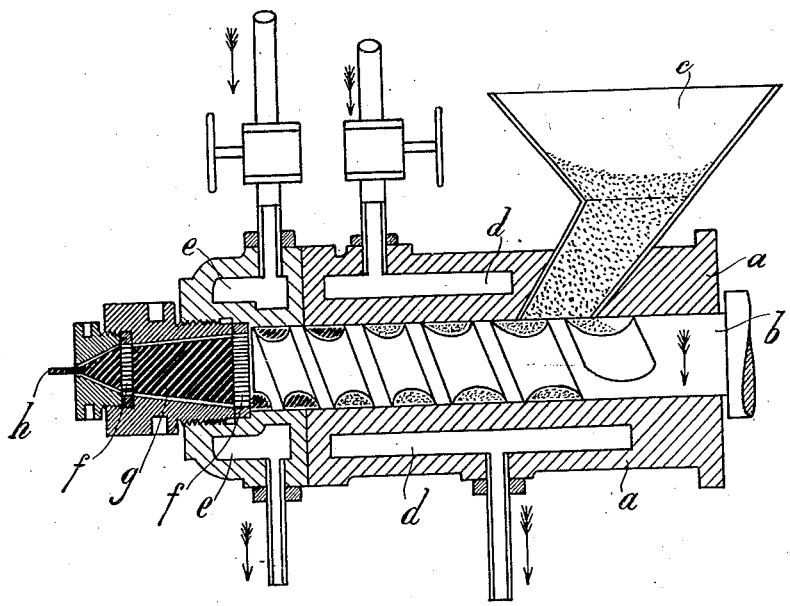
Inventor:
A. Bartels.
By
Attorney

_UNITED STATES PATENT OFFICE._

AMANDUS BARTELS, OF HARBURG-ON-THE-ELBE, GERMANY.

APPARATUS FOR THE MANUFACTURE OF HORN-LIKE MASSES FROM CASEIN.

1,375,623. Specification of Letters Patent. Patented Apr. 19, 1921.

Application filed February 16, 1916, Serial No. 78,628. Renewed April 22, 1920. Serial No. 375,910.

*To all whom it may concern:*

Be it known that I, Dr. AMANDUS BARTELS, a subject of the King of Prussia, residing at Harburg-on-the-Elbe, Buxtehuderstrasse 102, in the Kingdom of Prussia, German Empire, have invented certain new and useful Improvements in Apparatus for the Manufacture of Horn-Like Masses from Casein, of which the following is a specification.

This invention relates to improvements in apparatus for producing horn-like masses from casein by a continuous process. The continuously fed granular slightly moistened casein is compressed in the rear portion of a cylindrical press under gradually increasing pressure, while being moved forward, and is then kneaded in an adjacent forward chamber that is provided with a heating apparatus, and the finished mass is pressed out through the outlet that is fitted with a nozzle.

The apparatus according to the invention consists substantially of a screw press having a cylinder (that is cooled at the supply channel and heated at the kneading chamber) for receiving and compressing the granular casein into a plastic horn-like mass, and obstacles that serve to produce a high pressure are arranged in the pressed "string" of mass. These obstacles or resistances serve also as kneading members. Owing to the initial cooling the slightly moistened casein (to which coloring matters and filling matters are added if necessary) remains at first still granular, so that the air can escape to the rear. For cooling and heating purposes the cylinder is provided with suitable jackets into which the cooling or heating fluid is admitted. The mass in the heated portion of the cylinder becomes gradually denser under high pressure and at the same time is kneaded energetically by the obstacles arranged in the kneading chamber.

It is advisable to make the thread of the pressing screw with different pitches along the latter, so that the pressure will increase gradually toward the end of the spindle, that is to say, toward the front end the thread is closed and is more steeply inclined to the horizontal, so that the mass is compressed to a greater degree.

Screw presses are known *per se*. This invention however consists not only in a completely new use, but also in a different construction of such a press, such as the forms of the screw of the cylinder and of a separate kneading chamber which are requisite for producing the desired very high pressure.

The drawing shows the apparatus in longitudinal section. The screw spindle $b$ is moved in the direction of the arrow in the cylinder $a$. Commercial casein which contains in all about 20 to 50 per cent. of water, and has been previously mixed with the added coloring matters and filling substances, is pressed forward automatically from the charging hopper $c$ by the motion of the spindle, and is compressed. The casein remains granular at first owing to the action of the cooling medium flowing in the cooling jacket $d$. The forward portion of the cylinder $a$ is provided with the heating jacket $e$. Under the pressure and the heat the casein in this forward portion of the cylinder assumes a cohering plastic consistency, and it is then pressed through sieve-like obstacles $f$, $f^1$, arranged in the extension $g$ of the cylinder. These sieve-like obstacles serve as devices for kneading the "string" of mass, and effecting a most intimate mixing of the coloring matters and other admixtures with the casein and a perfectly homogeneous condition of the mass.

The mass then passes out from the outlet $h$ (fitted with a nozzle) in a homogeneous horn-like condition.

For the purpose of producing the desired sufficient high pressure, two sieve-like obstacles $f$, $f^1$ are interposed which serve also as kneading devices. In some cases only one of such obstacles will be sufficient. Also, according to requirement, more than two such obstacles may be provided, and the manner of distributing them in the press "string" may be varied. For instance, an obstacle in the form of a disk may be attached directly to the spindle, so that it will rotate with the latter. By that arrangement a further subdivision and mixing of the "strings" issuing from the sieve-like body will be effected.

I claim:

1. In an apparatus for manufacturing horn-like masses from casein, the combination of a casing formed with a bore, a screw operating in the bore, the threads of the screw being formed to compress the casein as same approaches the end of the bore, means for feeding casein to the threads of the screw, a cooling jacket surrounding the casing and a portion of the bore to cool the casein while being fed forward, an extension on the casing having a tapered bore which communicates with the first mentioned bore, a heating chamber surrounding a part of the bore in the extension and a part of the screw whereby to heat the compressed casein.

2. In an apparatus for manufacturing horn-like masses from casein, the combination of a casing formed with a uniform bore, a screw in the bore, the threads of the screw gradually decreasing toward one end, an extension on the casing, said extension having a tapered chamber which communicates with the bore in the casing, a sieve in said chamber which with the screw serves to knead the casein, and means for heating the casein while same is being kneaded.

In testimony whereof I affix my signature in presence of two witnesses.

Dr. AMANDUS BARTELS.

Witnesses:
   Francis R. Stewart,
   Dorothy Greenop.